May 24, 1966  N. MOREAU  3,252,782
BLOW MOLD WITH MOVABLE SUPPORT
Filed Nov. 22, 1961
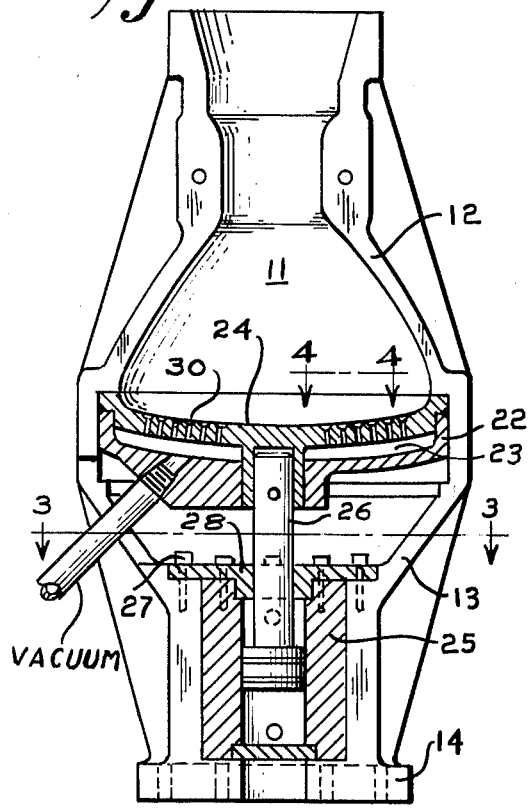
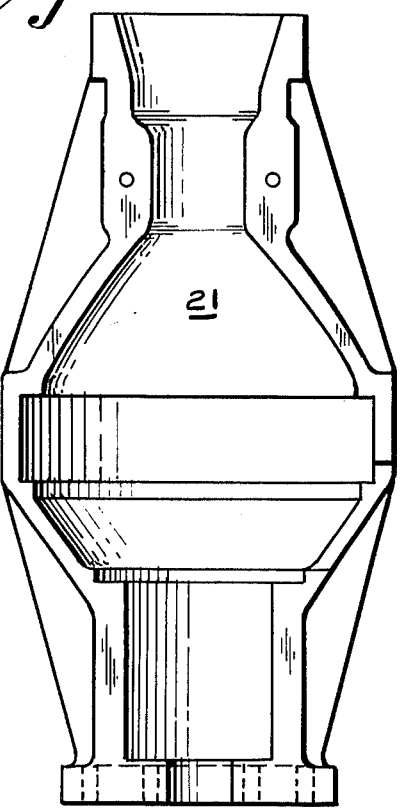
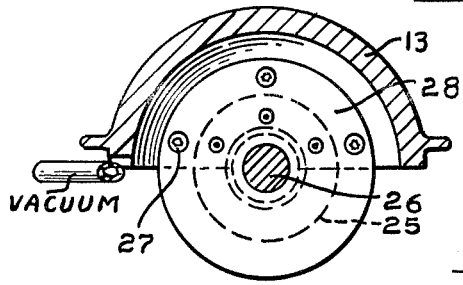
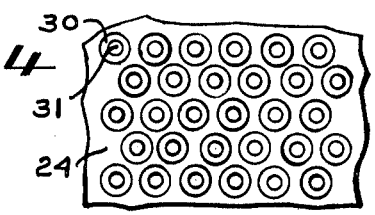
INVENTOR.
NORMAN MOREAU
BY
Clarence R. Patty, Jr.
ATTORNEY United States Patent Office 3,252,782
Patented May 24, 1966

3,252,782
BLOW MOLD WITH MOVABLE SUPPORT
Norman Moreau, Lincoln, R.I., assignor to Corning Glass Works, Corning, N.Y., a corporation of New York
Filed Nov. 22, 1961, Ser. No. 154,274
1 Claim. (Cl. 65—263)

The present invention relates to glass forming methods and to molds suitable for carrying out the same.

It has been the common practice to manufacture sealed beam projection flood lamps and similar lamp bulb envelopes, using two pieces of pressed glass comprising a necked funnel portion and a skirted lens portion respectively. The lenses of such envelopes have been pressed in molds having dimpled surfaces adapted to impart to the outer surfaces of the lenses closely arranged light diffusing bosses.

According to the present invention the entire envelope is blown by use of a mold embodying the invention which has a dimpled surface lens forming portion or end wall surrounded by axially separable sections of a bulb forming portion. The dimpled surface lens forming mold portion has a passage extending from the bottom of each dimple in communication with a chamber to which vacuum is appliable to form the bosses on the blown lens of the envelope. Also, conveniently, according to the invention the mold may have embodied in its facilities for axially lowering its face plate or lens forming portion from engagement with a formed article before separation of the bulb forming sections when they are to be separated by movement of one such section by a sliding movement in a downward lateral direction when being moved away from the finished bulb, while the other section rotates about a fixed axis away from such bulb in a manner fully shown and described in U.S. Patent No. 2,263,126, so that such a mold may be employed in a glass blowing machine such as disclosed in the above-cited patent.

In use the mold has its axially split sections closed about a hollow parison which is blown to form in the usual fashion. The blowing pressure employed is alone insufficient to project the blown lens into the dimples in the lens forming end wall surface of the mold. However, as the bulb is expanded against the lens forming surface of the mold vacuum is applied to the highly localized dimpled lens forming surface areas thereof through apertures in the bottoms of such lens forming mold portion. The blowing pressure aided by such application of vacuum forces the lens wall of the bulb into such dimples to form the required bosses on the exterior surface of the bulb. Subsequently the bulb forming mold sections may be laterally separated to clear the way for the removal of the finished bulb from the lens forming portion of the mold. In the particular form of structure shown, separation of the mold in the manner taught by the aforesaid patent is contemplated, in which circumstance the lens forming portion of the mold is necessarily retracted from the finished bulb before separation of such bulb forming sections is effected.

For a better understanding of the invention reference will now be had to the accompanying drawings wherein:

FIG. 1 is a side elevational view of one section of a split mold embodying the invention showing therein, in axial section, the axially movable portion of such mold and the fluid cylinder for axially moving it.

FIG. 2 is a side elevational view of the other section of such mold.

FIG. 3 is a sectional view taken on line 3—3 of FIG. 1.

FIG. 4 is a top plan view, on an enlarged scale of a fragment of the lens forming portion of the mold, taken on line 4—4 of FIG. 1.

FIG. 5 is an enlarged sectional elevation of a fragment of the end wall of an envelope formed in accordance with the invention.

Referring to the drawing in detail, each of the bulb forming mold halves or sections 11 and 21 has an upper portion such as 12, forming half of a bulb forming cavity and a depending portion such as 13 provided with a base 14 for attachment to a suitable mold half support, such for example as those shown in the aforesaid patent.

The depending portions of the mold sections jointly provide a cylindrical cavity for accommodating the face plate or lens forming portion 24 of the mold which has embodied about the underside thereof a backing member 22 forming thereabout a vacuum chamber 23.

The depending portions of the mold sections also jointly provide a cylindrical cavity for accommodating a fluid cylinder 25 to the free end of whose piston rod 26 the portion 24 is connected. Cylinder 25 is permanently secured to mold section 11, as by screws such as 27, which pass through an end plate 28 of cylinder 25 into the mold wall. As is clear from FIGS. 1 and 4, the lens forming portion 24 has in its upper surface a group of dimples or depressions such as 30 each connected to the vacuum chamber 23 via a passage such as 31.

Briefly the formation of an article is effected by closing the mold sections about a suspended parison in communication with a source of blowing air which blows the parison to semi-final form. The pressure of the blowing air being insufficient to project the end wall of the parison into the depressions or dimples in the end wall portion of the mold, a vacuum line is then placed in communication with the vacuum chamber to create negative pressure within the respective depressions to effect projection of the areas of the end 50 of the blown bulb thereover thereinto to form bosses 51 on the exterior surface thereof, and incidentally forming depressions such as 52 on its interior surface.

As will be understood the facilities provided for lowering the face plate or lens forming portion of a bulb are only essential when the axially split mold sections are to be separated from one another in a fashion similar to that disclosed in the aforesaid patent and that otherwise they may be dispensed with and the face plate mounted upon a fixed support with the mold sections conventionally hinged to one another for opening and closing thereabout in a conventional fashion if desired. Such modification of the structure would of course obviate the need for the shown depending portions of the axially split mold sections. If the mold were of the self-hinged type, its sections would then be separated in any conventional fashion to enable removal of the bulb from the end wall of the mold.

As shown, however, air is first supplied to the upper end of the cylinder 25 and exhausted from the lower end thereof, as through the medium of a conventional four-way control valve (not shown), to lower the end wall and thus permit separation of the mold sections and removal of the formed bulb in a manner fully taught in the hereinbefore referred to patent.

Although the invention has been described with reference to one particular embodiment, it is to be understood that this is by way of illustration and not by way of limitation.

What is claimed is:

A blow mold having an end wall whose interior surface has a multitude of closely spaced depressions therein and an axially split sidewall section surrounding said end wall, and means forming a vacuum chamber about the exterior surface of said end wall, said end wall having passages therethrough extending between the bottom of such depressions and the vacuum chamber whereby the atmospheric pressure can be reduced in said depressions to aid in the projection of article wall areas of an article within said mold and arranged over such depressions thereinto, an axially movable support for the end wall, said support being carried by one of said sidewall sections, and means for axially moving said support axially to move said end wall with respect to said sidewall sections.

References Cited by the Examiner

UNITED STATES PATENTS

| | | | |
|---|---|---|---|
| 632,058 | 8/1899 | Mossgrove | 220—2.1 X |
| 1,589,654 | 6/1926 | Mardock | 65—263 |
| 1,870,377 | 8/1932 | Newman | 65—110 X |
| 2,333,076 | 10/1943 | Stewart | 65—81 X |
| 2,352,957 | 7/1944 | Kell | 65—110 X |

FOREIGN PATENTS

| | | |
|---|---|---|
| 458,630 | 12/1936 | Great Britain. |
| 616,192 | 1/1944 | Great Britain. |

DONALL H. SYLVESTER, *Primary Examiner.*